Oct. 21, 1941.  C. N. LARSON  2,259,699
LENS CLEANER
Filed Oct. 4, 1939
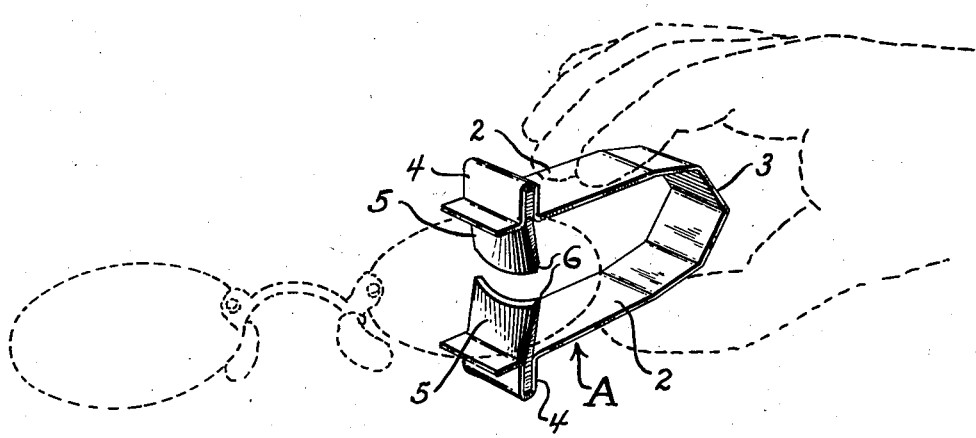
INVENTOR.
Conrad N. Larson.
BY
Chas. E. Townsend.
ATTORNEY.

Patented Oct. 21, 1941

2,259,699

UNITED STATES PATENT OFFICE 2,259,699

LENS CLEANER

Conrad N. Larson, San Francisco, Calif.

Application October 4, 1939, Serial No. 297,839

3 Claims. (Cl. 15—214)

This invention relates to a cleaner for cleaning the lenses of eyeglasses and spectacles.

The object of the present invention is generally to improve and simplify the construction and operation of lens cleaners; to provide a pair of rubber wiper blades and a holder therefor which permits the opposite faces of a lens to be cleaned simultaneously; and further, to provide a cleaner of the character described which is efficient in use and sufficiently compact and small to permit it to be readily carried.

The lens cleaner is shown by way of illustration in the accompanying drawing, which is a perspective view of the cleaner, said view also showing the manner in which it is used.

Referring to the drawing, A indicates in general a U-shaped member composed of a pair of arms 2—2 and a connecting portion 3. The U-shaped member is preferably constructed of thin sheet metal with sufficient spring action to maintain the arms apart; but it may obviously be formed of any one of a number of plastic materials having the same action. The outer ends of the arms are provided with clips such as shown at 4—4, and these function as holders or retainers for a pair of rubber wiper blades 5—5. These blades are preferably cut from pre-formed or vulcanized rubber tubing, so that each blade will present an end which is curved in cross section; but the blades may be molded, if desired, to attain the same shape.

In actual operation the cleaner is held between the thumb and fingers of the hand, as shown in the drawing, with the wiper blades applied to the opposite faces of the lens to be cleaned. The lens or eyeglasses should be held submerged under running water from a faucet, or in a bowl of cold water. A gentle pressure is applied and the wiper blades are moved back and forth, and as the ends of the wiper blades are curved they readily conform to the curvature of the lens; thus the lenses are quickly cleaned, after which they are dried by means of a soft cloth.

It should be noted that the ends of the wiper blades, besides being curved, terminate in sharp corners 6—6. This is important, as many eyeglasses are mounted in a surrounding frame. With the sharp corners it is possible to wipe up to and parallel with the frame, thus insuring cleaning of the entire lens without leaving marginal uncleaned areas. Films due to perspiration, adhering dust, etc., are quickly removed, and as the device is so small and compact as to permit it to be conveniently carried in a handbag or pocket, clean glasses are insured.

While certain features of my invention have been more or less specifically described, I nevertheless wish it understood that the materials and finish of the parts employed may be such as the manufacturer desires or conditions of use indicate; that changes may be resorted to within the scope of the appended claims.

Having thus described and illustrated my invention, what I claim and desire to secure by Letters Patent is:

1. A device for cleaning lenses comprising a U-shaped member terminating in a pair of substantially parallel flexible arms movable to or away from each other, a clamping clip at the end of each arm, and a flexible rubber wiper blade secured in each clip, said blades being disposed at right angles to the arms and directed toward each other to permit the ends of the rubber blades to engage the opposite faces of the lens to be cleaned, and said blades being curved at the ends to conform to the curvature of the lens faces.

2. A device for cleaning lenses comprising a U-shaped member terminating in a pair of subtantially flexible arms movable to or away from each other, a clamping clip at the end of each arm, and a flexible rubber wiper blade secured in each clip, said blades being disposed at right angles to the arms and directed toward each other to permit the ends of the rubber blades to engage the opposite faces of the lens to be cleaned, said blades being curved at the ends to conform to the curvature of the lens faces, and being arcuate in cross section.

3. A lens cleaner comprising a U-shaped member with opposed complementary spring legs and each leg having adjacent to its outer end a transversely arranged, opposed, complementary, outwardly extending U portion to form clips to receive a wiper blade, the ends of the legs being extended beyond the blade receiving clips to permit the latter to be opened slightly in order to insert the wiper.

CONRAD N. LARSON.